United States Patent [19]

Adams et al.

[11] Patent Number: 4,539,644
[45] Date of Patent: Sep. 3, 1985

[54] ELECTRONIC TAXIMETER AND CONTROL SYSTEM THEREFOR

[75] Inventors: Jürgen Adams; Hugo Schelling, both of Villingen-Schwenningen, Fed. Rep. of Germany

[73] Assignee: Kienzle Apparatus GmbH, Schwenningen, Fed. Rep. of Germany

[21] Appl. No.: 379,448

[22] Filed: May 18, 1982

[30] Foreign Application Priority Data

May 19, 1981 [DE] Fed. Rep. of Germany ....... 3119812

[51] Int. Cl.³ .............................................. G07B 13/08
[52] U.S. Cl. .................................... 364/467; 235/33; 235/30 R; 235/30 A
[58] Field of Search ........... 364/467; 235/30 R, 30 A, 235/33

[56] References Cited

U.S. PATENT DOCUMENTS 3,860,806  1/1975  Fichter et al. ...................... 364/467
4,167,040  9/1979  Heritier et al. ................. 364/467 X
4,212,069  7/1980  Baumann ............................. 364/467
4,245,305  1/1981  Gechele et al. ..................... 364/200

Primary Examiner—Errol A. Krass
Assistant Examiner—Edward R. Cosimano
Attorney, Agent, or Firm—Toren, McGeady, Stanger, Goldberg & Kiel

[57] ABSTRACT

In the taximeter disclosed, a microprocessor responds to a first set of pulses representing time and a second set of pulses representing distance and receives data representing a tariff from a constant store. The microprocessor calculates fares and advances the fares continuously on the basis of new calculations, while entering the results in a display for the driver and passenger. The constant store is in the form of a non-volatile memory for receiving programming data from an external source through a connector.

15 Claims, 2 Drawing Figures

ELECTRONIC TAXIMETER AND CONTROL SYSTEM THEREFOR

BACKGROUND OF THE INVENTION

This invention relates to an electronic taximeter in which an electronic calculator calculates a fare based on distance and time and constant data representing a tariff stored in a constant store so that the fare may be indicated by a display, and uses a device for programming the constant generator.

As known, a taximeter is used in a taxi to calculate a fare on the basis of the services rendered. The basis for calculating the fare are increments of distance and/or increments of waiting time. For adapting the meter to locally differing conditions, the distance and time increments are multiplied by a factor, the so-called tariff, and the fare is continuously determined in a calculating device and indicated by a display. During a trip, the meter develops and displays the total fare by summing the predetermined fare increments and advancing the display to higher values by the predetermined fare increments. The tariff regulations also provide a base or initial fee for securing a minimal amount for a trip that has been started. When services go beyond the usual scope, calculating the fare on the basis of distance and time is insufficient, and so-called additions or extras, which are normally debited as fixed amounts, are added to the sum of the fare units at the end of a trip. Separate memories (RAMs) store details, such as total trips made, total extras performed, total fare units, total distances travelled, distances with the taxi occupied, and the like for management purposes and for economic control. These data must therefore be available for evaluation at any time in an accessible form.

Electronic taximeters come in a whole line of embodiments which calculate basic fare increments by producing a pulse series representing the waiting time and another pulse series simultaneously representing distances. This is shown in German Patent Publications DE-OS 12 59 129, DE-OS 17 74 560, DE-OS 21 38 863. As a rule, the pulse series enter a binary reduction device which generates a pulse that then passes into a succeeding main counter which represents fare increments to be displayed. The reduction ratios set up in the binary reduction devices correspond to the local tariff valid at the place of use of the taximeter. This leads to a question of expenditure for any modification in the basic tariff data which are used for fare calculation. A modification in the tariff data of new values in the known devices would mean an alteration in the hard wired connections representing reduction ratios and set up in matrix form. Hence, for modifications, the taximeter must be taken out and after performing the alterations to the interior of the taximeter be remounted in the taxi. This means unjustified cost and lost time just for setting a new tariff in the taximeter.

In view of these disadvantages, basic tariff data have already been coded in an exchangeable programmable read-only memory (PROM) so that making tariff changes is accomplished by simply changing one module, that is the PROM. This makes possible an uncomplicated and quick modification in the taximeter of the new tariff data without removing the apparatus from the vehicle. (German Patent Publication DE-PS 22 02 865 illustrates the latter principle.) Such a PROM is a module whose elements irreversibly store the desired contents. This means that for each minor modification in the tariff structure, the module must be exchanged for a completely new module (PROM) that is adjusted to the newly modified tariff. Also, this solution is not quite satisfactory when considering that the tariff structure frequently may change, for instance, due to currency devaluations or changing locations of the taximeter which make it necessary to change the tariff PROM each time. Finally, the production and exchange of the new tariff store is permitted only by specially authorized persons or workshops which always accounts for considerable waste of time and money.

Another known embodiment for storing tariff data is described in German Patent Publication DE-OS 28 22 019. Here, the calculating arrangement of the taximeter is combined with a read-write store (RAM) of low current consumption so that new tariff data may be entered by an external device which is to be connected to the central processing unit (CPU) that communicates with the read and write store. The kind and specification of the read and write store make it possible repeatedly to modify the parameters defining the tariff. However, the big disadvantage of this known device is that carrying through a modification of the tariff data in the tariff store occupies much of the programming capacity of the calculating device. Apart from that, it is also necessary that the read and write store, according to this device, be continuously connected to a battery by means of an additional voltage control to provide a constant voltage supply. This means that, at each breakdown of the supply voltage of any kind, the tariff data store loses its content and the tariff data for determining the fare are forfeited.

SUMMARY OF THE INVENTION

An object of the present invention is to improve devices of this type.

It is another object of the invention to furnish a device for repeatedly and modifiably storing tariff data in an electronic taximeter so that varied tariff data for fixing the fare can be entered as often as required and can be stored therein for as long as required without being dependent on a voltage source.

Still another object of the invention is to make it possible to execute preparation of the modified tariff data to be entered and accessing of the stored tariff data by means external to the meter.

To achieve these objects, in whole or in part, the microcomputer is connected to a non-volatile read and write store and the read and write store is arranged to have new tariff data repeatedly and directly entered therein through a connection to an external constant generator device without requiring any programming capacity from the microcomputer. As a result, a modified fare calculation may be made on the basis of the new tariff.

These and other features of the invention are pointed out in the claims. Other objects and advantages of the invention will be evident from the following detailed description when read in light of the accompanying drawings.

DETAILED DESCRIPTION OF PREFERRED EMBODIMENTS

Figure 1:
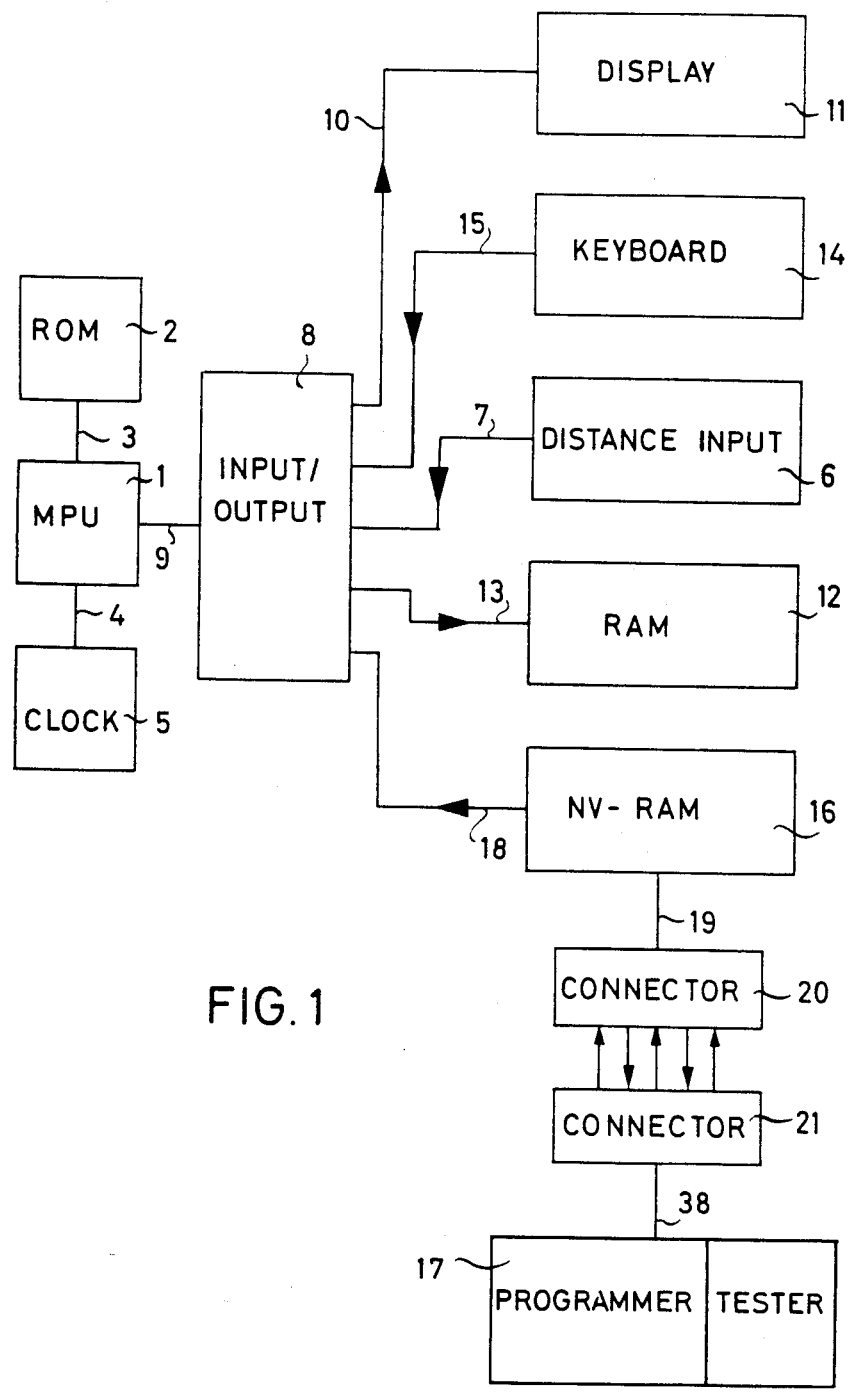
FIG. 1 is a block diagram of an electronic taximeter using a non-volatile read and write store (NV-RAM) and an externally connectable constant generator device.

The diagrammatic circuit according to FIG. 1 shows details of a taximeter. The heart of each taximeter is a calculating device, which, in the example shown, is embodied as a central microprocessor (MPU) 1. In response to programming instructions representing parameters concerning the operation of the taxi and given tariff regulations, the microprocessor calculates fare increments which are summed and continuously displayed during operation. The performance of the microprocessor MPU 1 is controlled by a mask programmed read only memory or ROM 2 which is connected to the microprocessor MPU 1 via a line 3. Also connected to the MPU 1 via line 4 is a clock pulse generator or oscillator 5 which produces system timing pulses that, when divided, establish the waiting time units.

As known and as already explained, the fare is essentially calculated on the basis of distance and time units plus a so-called initial or base fee. The term "distance unit" means the particular distance established in the local tariff which, when traversed by the vehicle, automatically produces an advance of the fare display unit by a certain fare increment. In order to allow for very exact measurement of the distance covered, a pulse generator, for instance, is driven by the tachometer shaft and delivers a very high number of pulses for each distance unit. Such a distance pulse generator 6 as may be seen from FIG. 1 is connected via lead 7 to an input-output unit 8 and via a lead 9 to the MPU 1 entering into the MPU 1 a number of pulses representing the distance covered. Correspondingly, for calculating the fare units on a time basis, the MPU 1 utilizes the constant time pulse frequency from the oscillator 5 which is connected to the MPU 1 by the lead 4. A program instruction from the ROM 2 initiates a calculating process to transform such pulses into fare increments in accordance with the fixed tariff.

Finally, a program instruction from ROM 2 decides which of the parts of the distance pulse sequence or the time pulse sequence are required to form the fare unit and to initiate an advance of one fare increment. Different evaluation procedures exist to accomplish this end. One such procedure involves selecting the higher frequency above a predetermined speed limit so that only distance pulses are used to calculate the fare, while, under that speed limit, only time pulses which are normally called waiting time pulses, are transformed into fare units. Another procedure involves combining distance pulses and time pulses to form a fare increment. Almost unlimited numbers of calculation procedures are technically possible due to the technical means used.

Waiting time pulses, and the pulse intervals, which are used to form fare units result from the frequency of the oscillator 5 which is permanently in operation when the taximeter is on. To reduce the time pulse frequency in steps with sufficient exactness, the relatively high frequency of the oscillator 5 is reduced in comparison to the tariffs to the frequency of the fare increment pulses. For its operation and control, the MPU 1 is principally dependent on the program stored in the ROM 2. The program is established on the basis of the locally determined tariff regulations and is correspondingly stored in the ROM 2. The program stored in the ROM 2 places the MPU 1 in a position to calculate all possible tariff fees, to combine them with fixed base fees, to store them, and to transmit output signals which represent fare increments via line 9 to the input-output unit 8 and ultimately a line 10 to a fare display unit 11. The display unit 11 is composed of several decades of a decimal figure indicating arrangement including the usual decoding and amplifying stages.

Certain data which are required for a survey of the operation of a taxi, be it for bookkeeping purposes over a certain period of time or for economic or management purposes, must always be available for recall. For this reason, there is a store which can be accessed at any time in the form of a RAM (Random Access Memory) 12, which is connected by a line 13 to the input-output unit 8 and ultimately by a line 9 to the MPU 1. The RAM 12 serves as a so-called read and write store and, in dependence on the program instructions from the ROM 2, contains all data to be stored from the MPU 1. As a rule, such data are the control counter data which give information concerning the total distance covered, the occupied distance covered (i.e., when the taxi is occupied by one or more passengers) the number of trips, the fare units, the extras, and other fees. The contents of the RAM 12 may at any time be transferred to the display unit 11 under the control of a so-called operating unit as shown in the form of a keyboard 14, by operating certain keys or key combinations, and under program control. The data in the RAM 12, depending upon the selection of the program address in the ROM 2, are retained in the RAM 12 or may be erased by a corresponding instruction. Correspondingly, the keyboard 14 is connected by means of a lead 15 via the input-output unit 8 and a lead 9 to the MPU. Besides entering control instructions into the MPU 1, this also serves to enter additional data, such as, for instance, instructions to calculate the extras with respect to special services offered into the MPU 1.

In order to furnish a taximeter of the kind heretofore explained with a base independent of all other functions for calculating the fare units, the MPU 1 is connected via lead 9 to the input-output unit 8 and a lead 18 to a non-volatile read and write store NV-RAM 16. This is done in such a manner that without using the programming capacity of the MPU 1, the NV-RAM 16 may be repeatedly and directly loaded through the connection of an external constant generator device 17 with tariff data for a modified fare calculation. Simply, this means that services supplied, based on the distances covered and/or the waiting times, are determined in the form of pulse series to be counted. The counted pulse series are then subject to a mathematical operation, for instance, pulse reduction by a divisor established in the selected tariff, and the actual fare increment is calculated. The divisors, for example, serve as variable parameters in the taximeter and as such are defined by the locally established tariff structure. These parameters must be made available to the calculating means and MPU 1 as the so-called tariff data. The MPU may carry out calculating operations for the formation of the fare units exclusively on the basis of the tariff data read from the NV-RAM 16. The tariff data are stored in the non-volatile RAM 16 which is independent of control through the MPU 1 and may be set for instance to modified tariff data by suitable methods. Because the store is structured as an MNOS-store (metal nitride oxide semiconductor), the NV-RAM 16 does not need any supply voltage for retaining the tariff data. That also means that when the voltage supply of the taximeter is cut-off for a long time period, the NV-RAM 16 does not loose the tariff data and will be ready to function as soon as current is again supplied thereto. The data flow for writing in new or modified tariff data can be effected by an external constant generator device 17 without requiring any programming capacity of the MPU 1. This also means that no programming voltage will be required from within the taximeter itself.

To create a connection to the externally available constant generator device 17, the NV-RAM 16 is connected via a separate peripheral connection line 19 to socket elements in a connector 20 which contacts correspondingly shaped pin elements in connector 21 on the external constant generator device 17. By suitable selection of corresponding address instructions, this connection can cancel the existing data and write in new tariff data.

Figure 2:
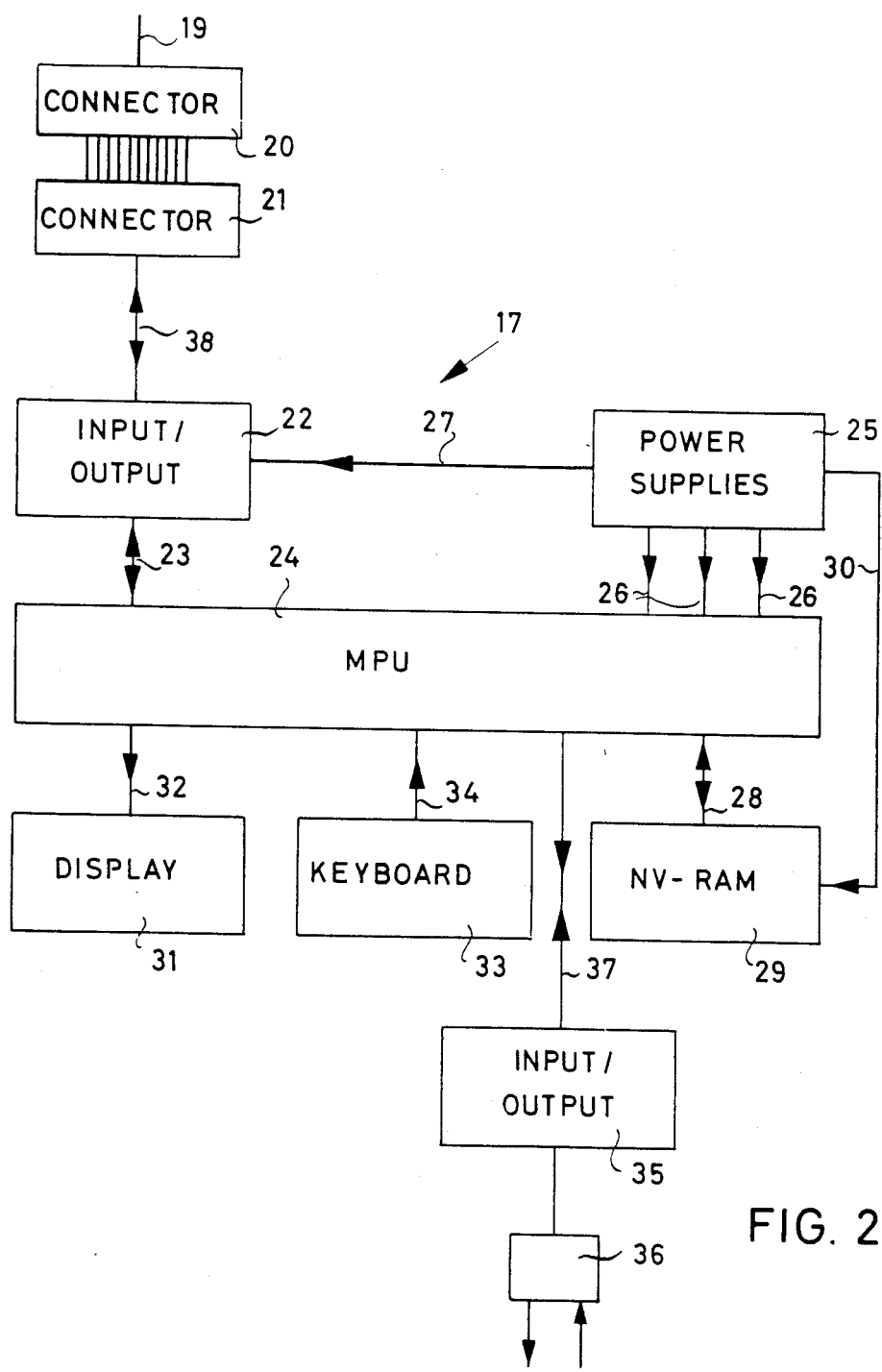
FIG. 2 is a block diagram of an embodiment of an externally applicable constant generator device in FIG. 1.

FIG. 2 shows a block diagram of the external constant generator device 17. A lead 38 connects the connector 21 to be plugged into the taximeter according to FIG. 1 to the constant generator device 17. An interface buffer 22 is connected by another lead 23 to the microcomputer unit MPU 24 of the constant generator device 17. The interface buffer unit 22 serves alternatively to treat input and output data. The MPU 24 is composed essentially of a CPU, an input-output unit, a ROM, a RAM, and a pulse generator. A power supply unit 25 serves to supply the constant generator device 17 with current via the leads 26 provided therein and also serves to supply the programming voltage. For supplying the programming voltage, the power supply unit 25 is connected by a lead 27 to the interface buffer 22 for writing in or deleting data in the NV-RAM 16 of the taximeter in accordance with a selected program. Simultaneously, the programming voltage of the power supply unit 25 also serves to supply the NV-RAM 29 within the constant generator device 17 through a lead 30. The NV-RAM supplies the MPU 24 via lead lead 28. RAM 29 has the function of a non-volatile intermediate store for the data. Writing and erasing (by words or totally) the NV-RAM requires programming voltages—that means voltages at the time of programming or deleting the NV-RAM—of the magnitude of ±12 V to ±25 V which vary substantially from the usual supply voltages in the system. Since the above described voltages of this size are required only when modifications in data in the NV-RAM are required, they need not be permanently supplied by the power supply of the taximeter. The power supply of the taximeter can therefore be much simpler because a corresponding transformer to produce such programming voltages can be omitted. This advantage is especially important because each taximeter would otherwise have to have a voltage transformer for the programming voltage so that, from a cost point of view, and with respect to any sources of errors, and so on, a very favorable result is achieved. The programming voltage always occurs in connection with the use of a constant generator device 17 and can therefore be made available in connection with the power supply 25 of the latter.

In a preferred embodiment of such an externally available constant generator device 17, an alphanumeric line display 31 is controlled via a lead 32 from MPU 24. When the tariff data are to be modified, the heretofore used tariff program is sometimes only modified to a very small extent. That means most of the data in the NV-RAM 16 remain unchanged. The data newly entered, however, are invisibly stored in the NV-RAM 16. The data remaining the NV-RAM 16 can be called-up on the line display means 31 of the constant generator device 17 and therefore can also be examined.

A keyboard 33 is connected by a data input line 34 to the constant generator device 17 for entering new or modified data into the constant generator device 17. All information entered via the keyboard 33 is at first intermediately stored and is then shown by an indication on the line display 31. New data is entered step by step in accordance with the task to be fulfilled, for instance, altering individual data, the entire data, control data, test data, etc., with varying sequences. A plausibility check can also be executed since data within one tariff are, to some extent, dependent on each other. For example, a check can be made whether a long distance unit is to be attributed to a very short waiting time unit. Such a result would be implausible. Also, the constant generator device 17 is able to check the program input with respect to its completeness or whether there are any faults so that the data may be completely accurate for utilization in the system of the taximeter. Since any fault in the data input or any faulty operation is indicated by decoded representation in the line display 31, each fault can be immediately recognized and can be corrected by operation of the constant generator device 17 before it is transmitted to the taximeter itself.

Also, all processes in connection with the converting constants are checked by the constant generator device 17. This device uses a system program, in which, for instance, the waiting time is entered in $/hours, while the value is stored in the stores NV-RAM 16 and 29 in $/sec. or as a correspondingly coded BCD value. Also, data which refer to function control of the taximeter (such as attributing a certain function to the operation of a certain key, admissibility of certain tariff data, calling up and blocking the control data, etc.) can be entered by the keyboard 33 in uncoded form, is coded by the system ROM of MPU 24 and made available in the NV-RAMs 16 and 29 in coded or uncoded form. Preferably, it is coded to save as much storage space as possible.

In view of such storage of data, the MPU 24 furnishes the possibility of coding and decoding the data between the keyboard 33, the MPU 24 and the stores 16 and 29, by means of a corresponding system program in the MPU 24. In this way, the tariff data from the stores 16 and 29 can also be shown in alphanumeric form at the line display 31 and can also be checked by the operator when entering them before they are finally stored.

Tariff data already processed by a computer may be loaded into the constant generator device 17. This is done by connecting the constant generator device 17 via a line 37 from the MPU 24 to a HOST-computer interface device 35 which, by means of a plug-in connection 36, may be connected to an external data processing arrangement. Such programming of the constant generator device 17 is of special advantage when modifications of a greater extent must be carried out, or when tariff data which are already available in data input form are used. Such a procedure simplifies the production of the data in the constant generator device 17. The store NV-RAM 16 is in the form of a random access memory.

As can be seen, the electronic taximeter includes an electronic calculator which calculates and displays a fare, based on distance and time pulses entered and constants received from a constant store and representing a tariff. The constant store NV-RAM is repeatedly programmable. To effect this, the microcomputer is connected to a non-volatile read and write RAM 16 which, without requiring programming capacity of the microcomputer, can receive tariff data for a modified fare basis repeatedly and directly from an externally available constant generator device 17.

The constant generator device 17 is an autonomous programmable device by means of which the NV-RAM in the taximeter may be directly loaded with a data program and such program may be modified.

While embodiments of the invention have been described in detail, it will be evident to those skilled in the art that many modifications and changes can be made therein without departing from its spirit and scope.

What is claimed is:

1. A taximeter, comprising:
    calculating means responsive to first signals representing time and second signals representing distance,
    a store for storing data representing a tariff,
    display means for displaying data,
    said store and said display means being connected to said calculating means for respectively furnishing data to and displaying data from the calculating means, said calculating means including a microprocessor and said store being a non-volatile read and write memory, and
    utilization means for utilizing the non-volatile read-write memory connected to said calculating means to program and reprogram the tariff from a source external to the taximeter while maintaining the position of the non-volatile read-write memory and without using the programming capacity of the microcomputer, said utilization means including coupleable and decoupleable connector means and electrical conductors for connecting the connector arrangement to said non-volatile read-write memory.

2. A taximeter as in claim 1, wherein said non-volatile memory includes means for having new data entered and old data erased through said connector.

3. A taximeter as in claim 1, wherein
    said non-volatile read and write memory is in the form of a metal nitride oxide silicon store which retains its information for extensive periods even without a power supply connected thereto.

4. A taximeter as in claim 1, wherein
    the connector is a socket element coupleable with a plug element for receiving programming and tariff data as well as test data.

5. A taximeter as in any of claims 1, 2, 3, or 4, wherein said non-volatile read and write memory including means to receive power for writing and erasing through said connector arrangement.

6. A taximeter system, comprising:
    a taximeter including clock means for time signals, non-volatile read-write memory means for storing tariff data, calculating means for receiving distance signals and calculating values on the basis of signals applied thereto, and electrical connecting means for connecting the memory means and the clock means to said calculating means so that said calculating means calculates a fare on the basis of the distance signals, time signals and tariff data;
    a data generator having microprocessor means for processing data; and
    a bi-directional electrical connection in said taximeter for selectively connecting said microprocessor means in said generator to said memory means to transmit tariff data in two directions between said non-volatile read-write memory means and said microprocessor means.

7. A system as in claim 6, wherein said bi-directional connection includes a coupleable and decoupleable connector for coupling and decoupling said generator from said taximeter.

8. A system as in claim 6, wherein
    said generator includes a keyboard for entering data.

9. A system as in claim 7, wherein
    said data generator includes a keyboard for entering data.

10. A system as in claim 6, wherein
    said generator includes a power supply for energizing said microprocessor and energizing said memory means through connection.

11. A system as in claim 7, wherein
    said generator includes a power supply for energizing said microprocessor and energizing said memory means.

12. A system as in claim 8, wherein
    said generator includes a power supply for energizing said microprocessor and energizing said memory means.

13. A system as in any one of claims 6 to 12, wherein
    said generator includes accessing means for accessing addresses in said non-volatile read-write memory means and an alphanumeric display device for displaying data in the non-volatile read-write memory means.

14. A system as in any of claims 6, 7, 8, 9, 10, 11, or 12, wherein
    said generator includes a keyboard connected to the microprocessor arrangement for preparing tariff data and display means connected to the microprocessor for viewing the data being prepared, and means for applying the data to the connection.

15. A system as in any of claims 6, 7, 8, 9, 10, 11, or 12, wherein
    said generator includes a HOST computer interface for receiving data and applying them to the connection.

* * * * *